US012254724B2

(12) United States Patent
Brook et al.

(10) Patent No.: US 12,254,724 B2
(45) Date of Patent: Mar. 18, 2025

(54) SYSTEM AND METHOD FOR PROVIDING USER FEEDBACK REGARDING DRIVING BEHAVIOR AND THE EFFECTS ON GAS CONSUMPTION AND VEHICLE WEAR

(71) Applicant: Quanata, LLC, San Francisco, CA (US)

(72) Inventors: Callum Brook, Piedmont, CA (US); Theobolt N. Leung, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 377 days.

(21) Appl. No.: 16/940,215

(22) Filed: Jul. 27, 2020

(65) Prior Publication Data
US 2023/0130875 A1 Apr. 27, 2023

(51) Int. Cl.
*G07C 5/08* (2006.01)
*G06F 18/214* (2023.01)
(Continued)

(52) U.S. Cl.
CPC ......... *G07C 5/0816* (2013.01); *G06F 18/214* (2023.01); *G06N 20/00* (2019.01);
(Continued)

(58) Field of Classification Search
CPC ....... G07C 5/0816; G07C 5/008; H04W 4/40; G06N 20/00; G06V 20/597; G06K 9/6256
See application file for complete search history.

(56) References Cited

U.S. PATENT DOCUMENTS 7,143,007 B2  11/2006  Long et al.
9,165,413 B2  10/2015  Jones et al.
(Continued)

FOREIGN PATENT DOCUMENTS

EP  1548653 A2  6/2005
FR  3056000 A1  3/2018
GB  2562054 A   11/2018

OTHER PUBLICATIONS

Bartosiak, Dave, "Crypto-car-ency? Porsche brings the blockchain to autos", TheDrive, available online at <https://www.thedrive.com/tech/18712/crypto-car-ency-porsche-brings-the-blockchain-to-autos>, 2018, 6 pages.

(Continued)

*Primary Examiner* — Ramsey Refai
*Assistant Examiner* — Roy Rhee
(74) *Attorney, Agent, or Firm* — BRYAN CAVE LEIGHTON PAISNER LLP (57) ABSTRACT

A computer-implemented method for providing feedback to drivers of vehicles is disclosed. The method comprises receiving an image corresponding to a vehicle indicating driving behavior data associated with a user. The driving behavior data are indicative of wear and tear on the vehicle or fuel efficiency for the vehicle and the driving behavior data indicative of an impact associated with the user on longevity of the vehicle. Based at least in part upon analyzing the image and determining a driving performance metric associated with the user feedback associated with the user is generated and provided to a mobile device associated with the user for presentation at the mobile device.

20 Claims, 6 Drawing Sheets

(51) Int. Cl.
  *G06N 20/00* (2019.01)
  *G06V 20/59* (2022.01)
  *G07C 5/00* (2006.01)
  *H04W 4/40* (2018.01)

(52) U.S. Cl.
  CPC ............ *G06V 20/597* (2022.01); *G07C 5/008* (2013.01); *H04W 4/40* (2018.02)

(56) References Cited

U.S. PATENT DOCUMENTS

| | | | |
|---|---|---|---|
| 9,181,895 | B2 | 11/2015 | Roberts et al. |
| 10,839,015 | B1 | 11/2020 | Leise et al. |
| 11,164,406 | B2 | 11/2021 | Meroux et al. |
| 2012/0239478 | A1 | 9/2012 | Yang et al. |
| 2015/0228129 | A1* | 8/2015 | Cox ................ G06Q 10/08 701/1 |
| 2016/0371788 | A1* | 12/2016 | Rackley, III ......... G06Q 10/105 |
| 2017/0046669 | A1 | 2/2017 | Chow et al. |
| 2017/0124784 | A1* | 5/2017 | Wittmann ............ G06V 30/224 |
| 2018/0202822 | A1 | 7/2018 | Delizio |
| 2018/0374283 | A1 | 12/2018 | Pickover et al. |
| 2019/0173854 | A1 | 6/2019 | Beck |
| 2019/0378352 | A1 | 12/2019 | Dey et al. |
| 2020/0005559 | A1 | 1/2020 | Grunbok et al. |
| 2020/0073864 | A1 | 3/2020 | Jo |
| 2020/0074853 | A1 | 3/2020 | Miller et al. |
| 2020/0081699 | A1 | 3/2020 | Majed et al. |
| 2020/0200090 | A1 | 6/2020 | Costello et al. |
| 2020/0213329 | A1 | 7/2020 | Simons |
| 2020/0226559 | A1 | 7/2020 | Boss et al. |
| 2020/0242858 | A1 | 7/2020 | Meroux et al. |
| 2020/0311665 | A1 | 10/2020 | Gray et al. |
| 2020/0402149 | A1 | 12/2020 | Dutta et al. |
| 2020/0402391 | A1 | 12/2020 | Dutta et al. |
| 2021/0056443 | A1* | 2/2021 | Bradley ............... G07C 5/0816 |
| 2021/0105276 | A1 | 4/2021 | Collinson et al. |
| 2021/0133670 | A1 | 5/2021 | Cella et al. |
| 2021/0239478 | A1 | 8/2021 | Mathai et al. |
| 2021/0272207 | A1* | 9/2021 | Fields .............. G08G 1/096758 |
| 2022/0244736 | A1* | 8/2022 | Konrardy ............ G05D 1/0088 |

OTHER PUBLICATIONS

Gaurav Yadav, "Blockchain writing a new chapter for automotive industry", available online at <https://hackernoon.com/blockchain-writing-a-new-chapter-for-automotive-industry-48a8151eec99>, 2018, 11 pages.

Javier E. Meseguer Anastasio, "A novel framework to promote eco-driving through smartphone-vehicle integration", Doctoral thesis, Universitat Politécnica de Valencia, 2017, 154 pages.

Kyle A. Owens, "Brave new wheels? Potential uses for blockchain technology in auto finance", NextGen Financial Services Report, Financial Services Industry Group at Dykema, available online at <https://www.nextgenfinancialservicesreport.com/2018/10/brave-new-wheels-potential-uses-blockchain-technology-auto-finance/>, Oct. 24, 2018, 6 pages.

Shell, "In-vehicle monitoring systems improve driving skills", available online at <https://www.shell.com/business-customers/shell-fleet-solutions/health-security-safety-and-the-environment/in-vehicle-monitoring-systems-can-help-everyone-to-improve-their-driving-skills.html>, retrieved on Oct. 25, 2021, 5 pages.

SinglePoint, Inc., "SinglePoint Subsidiary ShieldSaver Inks Deal with CarFax; Continuing Expansion of Data Collection for Automotive Blockchain Initiative", available online at <https://www.globenewswire.com/news-release/2018/05/01/1493968/0/en/SinglePoint-Subsidiary-ShieldSaver-Inks-Deal-with-CarFax-Continuing-Expansion-of-Data-Collection-for-Automotive-Blockchain-Initiative.html>, 2018, 4 pages.

Blockchain Based Verification Of Vehicle History For Pre-owned Vehicle Industry IEEE (Year: 2021).

Trust and Reputation in Vehicular Networks: A Smart Contract-Based Approach IEEE (Year: 2019).

* cited by examiner

SYSTEM AND METHOD FOR PROVIDING USER FEEDBACK REGARDING DRIVING BEHAVIOR AND THE EFFECTS ON GAS CONSUMPTION AND VEHICLE WEAR

FIELD OF THE DISCLOSURE

The present disclosure generally relates to vehicle gas consumption and wear and tear determination and, more specifically, to technologies that notify users of vehicle gas consumption and wear and tear information.

BACKGROUND

Driving causes wear on vehicular components and consumables. Generally, smoother driving results in less wear of tires, brakes, and other vehicular components and consumes less fuel. Prompting behavioral change that results in smoother driving may result in improved vehicle conditions generally and reduce operating costs for a driver. Additionally, such behavioral change may be more environmentally friendly. However, tracking vehicle wear and tear and fuel consumption can be difficult for drivers. Additionally, drivers may knowingly or unknowingly alter vehicle wear and tear and fuel consumption information when tasked with tracking the information themselves. For example, drivers may accidentally incorrectly enter the number of miles driven using one tank of gas into a fuel tracking program.

BRIEF SUMMARY

In one aspect, a computer-implemented method for providing feedback to drivers of vehicles includes receiving, at one or more processors, an image corresponding to a vehicle indicating driving behavior data associated with a user, the driving behavior data indicative of (i) wear and tear on the vehicle or (ii) fuel efficiency for the vehicle and the driving behavior data indicative of an impact associated with the user on longevity of the vehicle. The method also includes analyzing, by the one or more processors, the image corresponding to the vehicle used to obtain the driving behavior data and determining, by the one or more processors, a driving performance metric associated with the user based at least in part upon the driving behavior data. The method further includes generating, by the one or more processors, feedback associated with the user based at least in part upon the driving performance metric and providing, by the one or more processors, the feedback to a mobile device associated with the user for presentation by the mobile device.

In certain embodiments, the method may further include obtaining, by the one or more processors, a plurality of driving performance metrics associated with a plurality of other users, wherein generating the feedback associated with the user includes comparing, by the one or more processors, the driving performance metric associated with the user to the plurality of driving performance metrics associated with the plurality of other users and providing, by the one or more processors, an indication of the driving performance metric associated with the user relative to the plurality of driving performance metrics associated with the plurality of other users to the mobile device. The plurality of other users may have vehicles with a same make, model, or year as the vehicle associated with the user.

In certain embodiments, the method may further include training, by the one or more processors, a machine learning model for determining the driving performance metric using (i) a plurality of sets of driving behavior data associated with a plurality of users with vehicles having known longevity and (ii) indications of the longevity of the vehicles associated with the plurality of users and applying, by the one or more processors, the driving behavior data associated with the user to the machine learning model to generate the driving performance metric. The driving performance metric may include one of a wear and tear score or a fuel efficiency score.

The image may be a receipt image, a gas pump image, a credit card history image, an odometer image, a vehicle image, a tire image, and/or an engine image. The method may further include providing, by the one or more processors, an indication of a condition of the vehicle based at least in part upon the driving performance metric. The method may further include receiving additional driving behavior data from the user's mobile device, sensors on the vehicle, or via user input on the mobile device and wherein determining the driving performance metric is further based at least in part upon analyzing the additional driving behavior data from the mobile device data, the sensors on the vehicle, or the user input on the mobile device. Providing the feedback to the mobile device associated with the user may include providing, by the one or more processors, a prompt to the user to change one or more driving behaviors based at least in part upon the driving performance metric.

In another aspect, a system computing system for providing feedback to drivers of vehicles includes one or more processors and a program memory. The program memory scores executable instructions that, when executed by the one or more processors, cause the computing system to receive an image corresponding to a vehicle indicating driving behavior data associated with a user, the driving behavior data indicative of (i) wear and tear on the vehicle or (ii) fuel efficiency for the vehicle, the driving behavior data indicative of an impact associated with the user on longevity of the vehicle. The instructions also cause the computing system to analyze the image corresponding to the vehicle used to obtain the driving behavior data and determine a driving performance metric associated with the user based at least in part upon the driving behavior data. The instructions further cause the computing system to generate feedback associated with the user based at least in part upon the driving performance metric and provide the feedback to a mobile device associated with the user for presentation by the mobile device.

In certain embodiments, the program memory may further store executable instructions that cause the computing system to obtain a plurality of driving performance metrics associated with a plurality of other users, wherein to generate the feedback associated with the user includes comparing the driving performance metric associated with the user to the plurality of driving performance metrics associated with the plurality of other users and providing an indication of the driving performance metric associated with the user relative to the plurality of driving performance metrics associated with the plurality of other users to the mobile device. The plurality of other users may have vehicles with a same make, model, or year as the vehicle associated with the user.

In certain embodiments, the program memory may further store executable instructions that cause the computing system to train a machine learning model for determining the driving performance metric using (i) a plurality of sets of driving behavior data associated with a plurality of users with vehicles having known longevity and (ii) indications of the longevity of the vehicles associated with the plurality of users and apply the driving behavior data associated with the user to the machine learning model to generate the driving performance metric. The driving performance metric may include one of a wear and tear score or a fuel efficiency score.

The image may be a receipt image, a gas pump image, a credit card history image, an odometer image, a vehicle image, a tire image, and/or an engine image. The program memory may further store executable instructions that cause the computing system to provide an indication of a condition of the vehicle based at least in part upon the driving performance metric. The program memory may further store executable instructions that cause the computing system to receive additional driving behavior data from the user's mobile device, sensors on the vehicle, or via user input on the mobile device and wherein to determine the driving performance metric is further based at least in part upon analyzing the additional driving behavior data from the mobile device data, the sensors on the vehicle, or the user input on the mobile device. To provide the feedback to the mobile device associated with the user may include providing a prompt to the user to change one or more driving behaviors based at least in part upon the driving performance metric.

In yet another aspect a tangible, non-transitory, computer-readable medium stores instructions for providing feedback to drivers of vehicles, that when executed by one or more processors of a computing device, cause the computing device to receive an image corresponding to a vehicle indicating driving behavior data associated with a user, the driving behavior data indicative of (i) wear and tear on the vehicle or (ii) fuel efficiency for the vehicle, the driving behavior data indicative of an impact associated with the user on longevity of the vehicle. The instructions, when executed, also cause the computing device to analyze the image corresponding to the vehicle used to obtain the driving behavior data and determine a driving performance metric associated with the user based at least in part upon the driving behavior data. The instructions, when executed, further cause the computing device to generate feedback associated with the user based at least in part upon the driving performance metric and provide the feedback to a mobile device associated with the user for presentation by the mobile device.

In certain embodiments, the tangible, non-transitory, computer-readable medium stores additional instructions, that when executed by the one or more processors of the computing device, may cause the computing device to obtain a plurality of driving performance metrics associated with a plurality of other users, wherein to generate the feedback associated with the user includes comparing the driving performance metric associated with the user to the plurality of driving performance metrics associated with the plurality of other users and providing an indication of the driving performance metric associated with the user relative to the plurality of driving performance metrics associated with the plurality of other users to the mobile device.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Traditionally, determining driving performance of a driver needs relying on the driver's self-reported driving behavior. Often, drivers may not have time to self-report behavior and additionally, drivers may knowingly or unknowingly misreport driving behavior. In certain embodiments, driving performance may be based at least in part upon collecting and analyzing telematics data. However, not all vehicles and driver devices may be equipped to collect telematics data. Accordingly, the present embodiments advantageously prompt a driver to take photographs indicative of driving behavior, which is often faster and easier for drivers, encourages reporting of driving behavior information and more accurate driving behavior information.

Furthermore, the driver feedback system described herein analyzes driving behavior data associated with a user to identify areas where the user can improve to increase the longevity of the vehicle and/or decrease the amount of repairs needed for the vehicle. By presenting driver feedback indicative associated with the user's driving performance relative to other drivers and/or indicative of the impact the user's driving performance may have on the vehicle, the present embodiments advantageously provide a user interface that presents complicated telematics or other vehicle maintenance data in a manner that is easily understandable by a user. In comparison to alternative systems where raw telematics data are provided or the user is simply made aware that the telematics data are being analyzed without reporting the results to the user, the present embodiments allow the user to recognize where she needs to improve the most, and where she needs to remain consistent to maximize the lifespan of the vehicle and avoid the need for repairs.

Figure 1:
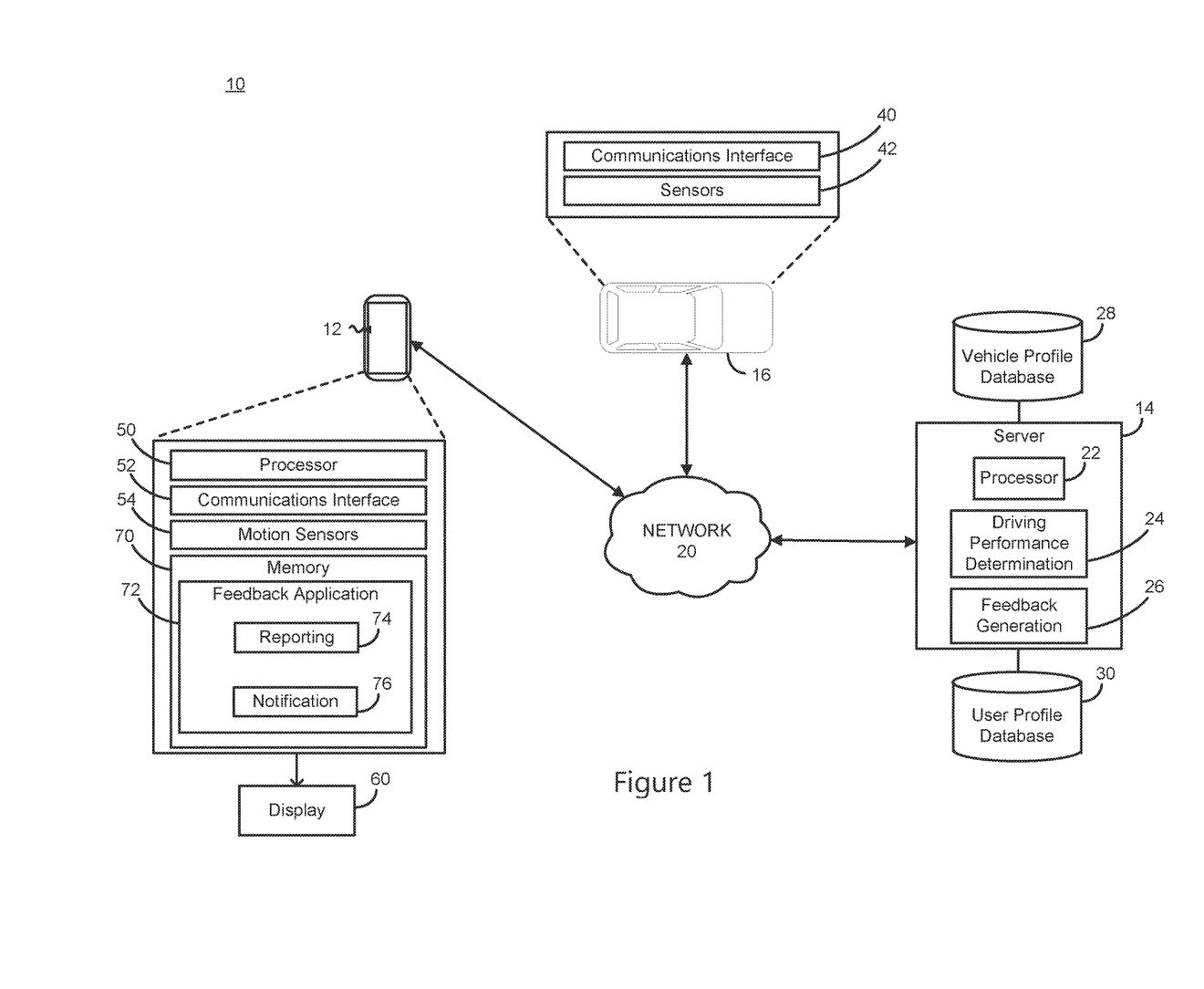
FIG. 1 depicts an example system in which user feedback regarding driving behavior may be generated and displayed, according to one embodiment.

FIG. 1 depicts an example environment 10 in which user feedback regarding driving behavior may be generated and displayed, according to one embodiment. As shown in FIG. 1, the example environment 10 includes a mobile device 12, a server 14, and a vehicle 16. The mobile device 12 and the vehicle 16 may be associated with the same user. Mobile device 12, and, in some examples, vehicle 16, is/are communicatively coupled to server 14 via a network 20. Network 20 may be a single communication network, or may include multiple communication networks of one or more types (e.g., one or more wired and/or wireless local area networks (LANs), and/or one or more wired and/or wireless wide area networks (WANs) such as the internet). While FIG. 1 shows only one mobile device 12, it is understood that many different mobile devices (of different users), each similar to mobile device 12, may be in remote communication with server 14. Additionally, while FIG. 1 shows only one vehicle 16, it is understood that many different entity locations, each similar to vehicle 16, may be in remote communication with server 14.

Mobile device 12, and vehicle 16, may all be remote from server 14, and mobile device 12 may also be remote (at least at certain times) from vehicle 16. A computer system of vehicle 16 may be coupled to server 14 via network 20, or a different network not shown in FIG. 1. Server 14 may be an individual server, a group (e.g., cluster) of multiple servers, or another suitable type of computing device or system.

Server 14 includes a processor 22. Processor 22 may include any suitable number of processors and/or processor types (e.g., one or more central processing units (CPUs)). Generally, processor 22 is configured to execute software instructions stored in one or more memories (e.g., stored in a persistent memory such as a hard drive or solid state memory) of server 14.

The software instructions executed by processor 22 include the instructions of a driving performance determination unit 24, and a feedback generation unit 26. The processor 22 may receive an image corresponding to a vehicle (e.g., vehicle 16) indicating driving behavior data associated with a user. The image may be received from mobile device 12, for example. Driving behavior data may be determined from telematics data. For example, driving behavior data may be indicative of acceleration, braking, speed, and/or cornering behavior of the driver. Additionally or In certain embodiments, driving behavior data may be determined from vehicle maintenance behavior data. For example, driving behavior data may be indicative of fuel usage, tire condition, and/or condition. The driving behavior data may be indicative of wear and tear on the vehicle or fuel efficiency for the vehicle which may indicate an impact associated with the user on the longevity of the vehicle. For example, driving behavior data may be used to determine that the vehicle is likely to last longer than other similar vehicles (e.g., having the same make, model, and/or year). In another example, the driving behavior data may be used to determine that the vehicle is likely to need repair and/or replacement earlier than other similar vehicles.

The driving performance determination unit 24 is generally configured to analyze the image corresponding to the vehicle to obtain the driving behavior data and determine a driving performance metric associated with the user based at least in part upon the driving behavior data. The driving performance metric may be indicative of fuel efficiency and/or vehicle maintenance and upkeep of the vehicle by the driver. For example, the driving performance metric may be a fuel efficiency rating, a miles per gallon rating, a tire condition rating, and/or an engine condition rating. Additionally or In certain embodiments, the driving performance metric may be a categorical metric (e.g., the vehicle condition, tire condition, engine condition, and/or gas consumption is/are very good, good, fair, poor, or very poor). Further, the driving performance metric may be a score (e.g., the vehicle condition, tire condition, engine condition, and/or gas consumption may receive a numerical score out of 10 or out of 100). The driving performance metric may be a comparison (e.g., the driver may be compared to other drivers of the same age, other drivers in the same region, other drivers of the same or similar vehicles, and/or the manufacturer's published guidelines). The comparison may be expressed as a percentile rank of performance and/or a category (e.g., better than an average driver of the same or similar vehicles). Furthermore, the driving performance metric may be based at least in part upon a set of driving behavior data collected at a particular time interval or may be based at least in part upon changes in driving behavior data over time. For example, the driving performance metric may be an average amount of fuel consumption for the vehicle over the previous month or a change in the amount of fuel consumption from a first time interval to a second time interval.

The image may be a receipt image, a gas pump image, a credit card history image, an odometer image, a vehicle image, a tire image, and/or an engine image. The driving performance metric may include one or both of a wear and tear score and a fuel efficiency score. For example, a gas receipt image may be analyzed by the driving performance determination unit 24 using optical character recognition (OCR). The driving performance determination unit 24 may detect, for example, the date of the receipt, the amount of gas filled, and the total cost. Additionally, the driving performance determination unit 24 may obtain an indication of the mileage for the vehicle at the time the vehicle was previously filled and an indication of the mileage for the vehicle during the current fill up, for example, from odometer images. Based at least in part upon the information detected, the driving performance determination unit may determine the miles per gallon gas consumption of the vehicle as well as the amount of money per mile that the user spent on gas. Based at least in part upon the analyzed gas receipt image and/or the odometer images, the driving performance determination unit 24 may determine, for example, a fuel efficiency score.

In certain embodiments, for example, a vehicle tire image may be analyzed by the driving performance determination unit 24. The driving performance determination unit 24 may detect a wear and tear of the vehicle such as a flat tire, a degradation of the tire material, a thinning of the tire material, and or/a tire pressure. More specifically, the driving performance determination unit 24 may identify features of a portion of the vehicle tire image corresponding to the tire (also referred to herein as an "object"), such as the geometry of the edges of the object, and RGB pixel values or colors within the object. These features may be identified by detecting stable regions within the object that are detectable regardless of blur, motion, distortion, orientation, illumination, scaling, and/or other changes in camera perspective. The stable regions may be extracted from the object using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the object, such as edges within the object. A bounding box may be formed around a keypoint and the portion of the object created by the bounding box may be a feature.

In some embodiments, the driving performance determination unit 24 may compare the features identified for the object to features from template objects (also referred to herein as "template features") using image classification and/or machine learning techniques, where at least some of the template objects represent a person. The machine learning techniques may include linear regression, polynomial regression, logistic regression, random forests, boosting, nearest neighbors, Bayesian networks, neural networks, support vector machines, or any other suitable machine learning technique. For example, the widths and heights of tires in various conditions may be stored as template features along with ratios of the diameter of the wheels compared to the thickness of the tires, shapes of the tires, thickness metrics at various positions within the tire, etc. The template objects may include representations of tires in good condition with an appropriate amount of tire pressure and tire material as well as representations of tires in moderate or poor condition such as flat tires, tires with low tire pressure, tires having thinning tire material, etc.

In some embodiments, the template features may be compared to the features for an object using a nearest neighbors algorithm. The nearest neighbors algorithm may identify template features which are the closest to the features of the object by creating numerical representations of the features to generate feature vectors, such as a pixel width and height of a tire, and RGB pixel values for the tire, for example. The numerical representations of the features or feature vectors of the object may be compared to the feature vectors of template objects to determine a vector distance between the features of the object and each template object. The driving performance determination unit 24 may then determine the condition of the tire or the amount of wear and tear on the tire based at least in part upon the amount of similarity, or the vector distance in the nearest neighbors algorithm, between the features for the object and the features for template objects that represent tires in various conditions and/or having various amounts of wear and tear. For example, if the closest template objects represent a tire in poor condition, the object is identified as a tire in poor condition. Based at least in part upon this analysis, the driving performance determination unit 24 may determine a wear and tear score for the tire in accordance with the determined condition of the tire.

Additionally, the driving performance determination unit 24 may train a machine learning model for determining the driving performance metric. The machine learning model may be trained based at least in part upon (i) a plurality of sets of driving behavior data associated with a plurality of users with vehicles having known longevity and (ii) indications of the longevity of the vehicles associated with the plurality of users. The driving performance determination unit 24 may apply the driving behavior data associated with the user to the machine learning model to generate the driving performance metric. For example, the machine learning model may be trained based at least in part upon a plurality of sets of average fuel consumption for Honda Civics having known lifespans. Based at least in part upon gas receipt analysis for a plurality of fueling events for a user's Honda Civic, the driving performance determination unit 24 may predict a lifespan and a related driving performance metric associated with the user.

In certain embodiments, the processor 22 may further receive additional driving behavior data from the user's mobile device 12, sensors 42 on the vehicle 16, or via user input on the mobile device 12. The driving performance determination unit 24 may determine a driving performance metric based at least in part upon analyzing the additional driving behavior data. The additional driving behavior data may be, for example, telematics data detected at sensors 42 within the vehicle 16 and sent to the server 14 by communications interface 40. Additionally, the additional driving performance behavior data may be telematics data detected at motion sensors 54 within the mobile device 12 and sent to server 14 by communications interface 52. Further, the additional driving performance data may be captured by the user via display 60 and sent to the server 14 by communications interface 52.

The driving performance determination unit 24 may utilize the additional driving behavior data to determine a wear and tear score, a fuel efficiency score, and a driving performance metric. For example, hard braking and hard cornering as determined by the driving performance determination unit 24 based at least in part upon telematics data may indicate a high wear and tear score, a low fuel efficiency score, and a low driving performance metric. Additionally, fuel consumption information, entered at the display 60, of the mobile device 12 may be further utilized by the driving performance determination unit 24 to determine the wear and tear score, the fuel efficiency score, and a driving performance metric.

Historical user and vehicle information may be stored in the user profile database 30. For example historical images and image analyses as well as historical telematics data and user input data may be stored at the user profile database 30. Additionally, the image corresponding to a vehicle indicating driving behavior for a user and additional driving behavior data when received at the server 14 may be stored at the user profile database 30.

Feedback generation unit 26 is generally configured to generate feedback associated with the user based at least in part upon the driving performance metric and provide the feedback to a mobile device (e.g., mobile device 12) associated with the user for presentation by the mobile device. Feedback generation unit 26 may further obtain a plurality of driving performance metrics associated with a plurality of other users and generate the feedback based at least in part upon comparing the driving performance metric associated with the user to the plurality of driving performance metrics associated with the plurality of other users. Further, feedback generation unit 26 may provide an indication of the driving performance metric associated with the user relative to the plurality of driving performance metrics associated with the plurality of other users to the mobile device. The plurality of driving performance metrics associated with a plurality of other users may be stored at the vehicle profile database 28. The feedback generation 26 unit may choose performance metrics from the vehicle profile database 28 for vehicles that have a same make, model, or year as the vehicle associated with the user. For example, the feedback generation unit 26 may provide a comparison to vehicles on average with the same make, model, and year.

Additionally, the feedback determination unit 26 may provide an indication of a condition of the vehicle based at least in part upon the driving performance metric. For example, the vehicle condition may be very good, good, fair, poor, or very poor. Additionally, the vehicle condition may be an indication of the value of the vehicle (e.g., the vehicle is presently worth $12,345). Additionally or In certain embodiments, the feedback to the mobile device associated with the user may include a prompt to the user to change one or more driving behaviors based at least in part upon the driving performance metric. For example, the feedback may prompt the driver to beat the vehicle manufacturer guidelines or beat the average mileage of drivers with the same or a similar vehicle. Additionally, the feedback may prompt the driving to beat the mileage of the previous week. Further, the feedback may include an indication of the emissions saved or an amount of money saved based at least in part upon a change in the user's behavior or a potential change in the user's behavior. Still further, the feedback may include a graph or a chart indicating a change in the user's driving behavior over time such as a change in the user's fuel consumption or emissions saved over a particular time period. The graph or chart may also include driving behavior data from other users over the same time period, such as fuel consumption metrics from the user's friends over the same time period or an average amount of fuel consumption over the same time period for vehicles with the same make, model, and/or year as the vehicle.

After providing a first feedback, the feedback determination module 26 may obtain a subsequent driving performance metric. Based at least in part upon the subsequent driving performance metric, the feedback determination module 26 may determine that the user followed or did not follow the first feedback. In response, the feedback determination module may provide subsequent feedback notifying the user that the first feedback was followed or not followed.

Mobile device 12 may be associated with (e.g., in the possession of, configured to provide secure access to, etc.) a particular user, who may be a driver of a vehicle, such as vehicle 16. Mobile device 12 may be a personal computing device of that user, such as a smartphone, a tablet, smart glasses, or any other suitable device or combination of devices (e.g., a smart watch plus a smartphone) with wireless communication capability. In the embodiment of FIG. 1, mobile device 12 includes a processor 50, a memory 52, motion sensors 54, and a display 60. As with processor 22, processor 50 may include any suitable number of processors and/or processor types. Processor 50 may include one or more CPUs and one or more graphics processing units (GPUs), for example. Generally, processor 50 is configured to execute software instructions stored in memory 70. Memory 70 may include one or more persistent memories (e.g., a hard drive and/or solid state memory) and stores one or more applications, including feedback application 72.

Feedback application 72 may be an application provided by a specific company (e.g., vehicle rental company, a vehicle manufacturer, an insurance company, etc.). Feedback application 78 includes a reporting unit 74 and a notification unit 76, and is described in more detail below. Memory 70 may also include one or more persistent memories configured to store data that is used and/or generated by notification application 72.

Communication interface 52 includes hardware, firmware and/or software that is generally configured to communicate with other devices (including network 20) using one or more communication protocols. For example, communication interface 56 may be configured to transmit and receive data using a BLUETOOTH protocol, a WiFi (ieee 802.11 standard) protocol, a near-field communication (NFC) protocol, and/or a cellular (e.g., LTE, WIMAX, etc.) Protocol. Motion sensors 54 may be configured to detect geolocation and/or telematics data. Motion sensors may include on or more of a GPS, an accelerometer, and a gyroscope.

The software instructions executed by processor 50 include the instructions of reporting unit 74 and notification unit 76.

Reporting unit 74 is generally configured to send telematics and GPS data from the motion sensor 54 of the of the mobile device 12 to server 14 via communication interface 52 using network 20. Reporting unit 74 may be further configured to prompt the user to enter information corresponding to vehicle wear and tear or fuel efficiency. For example, the reporting unit 74 may prompt a user to take a photograph of a gas receipt or a vehicle engine and tires. Further, the reporting unit may prompt a user to enter gas mileage information or vehicle condition information such as vehicle tune-up dates and oil change dates. Reporting unit 74 may be configured to send information only when requested by the server 14.

Notification unit 76 is generally configured to, in response to receiving feedback from server 14 via communication interface 52 via network 20, providing the feedback to a user of the mobile device via a display 60.

Vehicle 16 may include one or more sensor 42 including an accelerometer, a GPS sensor, and/or a gyroscope. The sensors may detect one or more of telematics data and GPS data of the vehicle. The vehicle 16 may communicate the telematics data and the GPS data via the communications interface 40 to the mobile device 12 and the server 14 via network 20.

Figure 2:
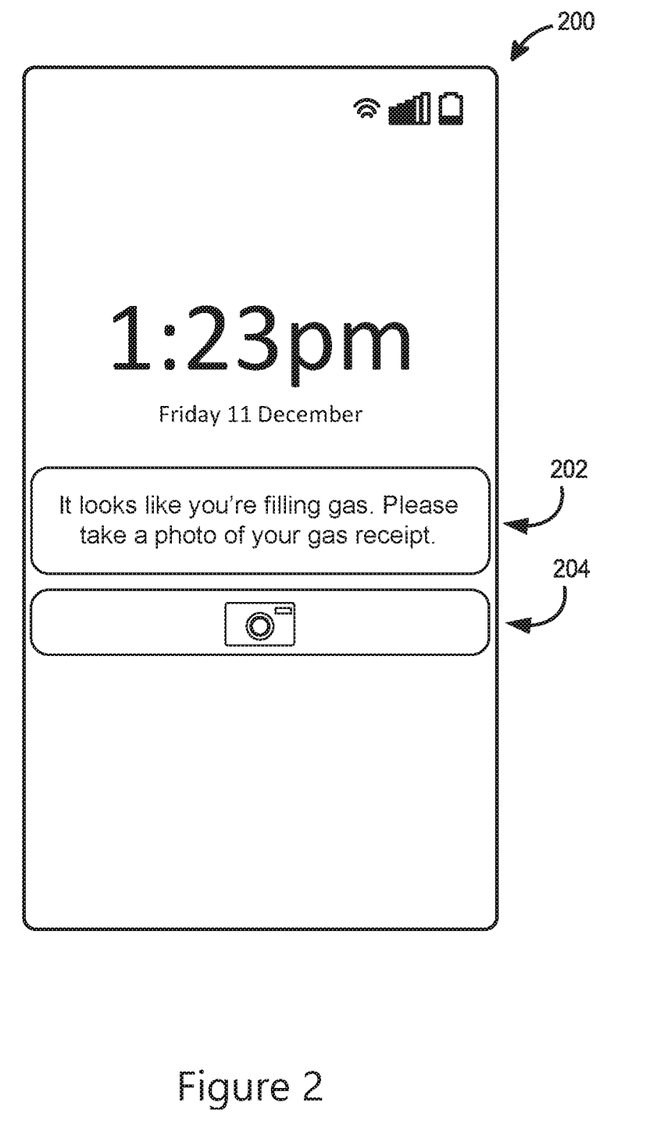
FIG. 2 depicts an example user interface at which information is collected for generating user feedback regarding driving behavior, according to one embodiment and scenario.

FIG. 2 depicts an example user interface at which information is collected for generating user feedback regarding driving behavior, according to one embodiment and scenario. A user interface 200 (e.g., presented on display 60) includes a push notification 202 with the message "It looks like you're filling gas. Please take a photo of your gas receipt." In some embodiments, this message may be presented at the mobile device 12 in response to mobile device 12 being proximate to a gas station. Further, the user interface provides a user interaction tool 204 to take a photograph. The photograph may be sent to the server 14 via network 20 and used to determine a driving performance metric associated with the user.

Figure 3:
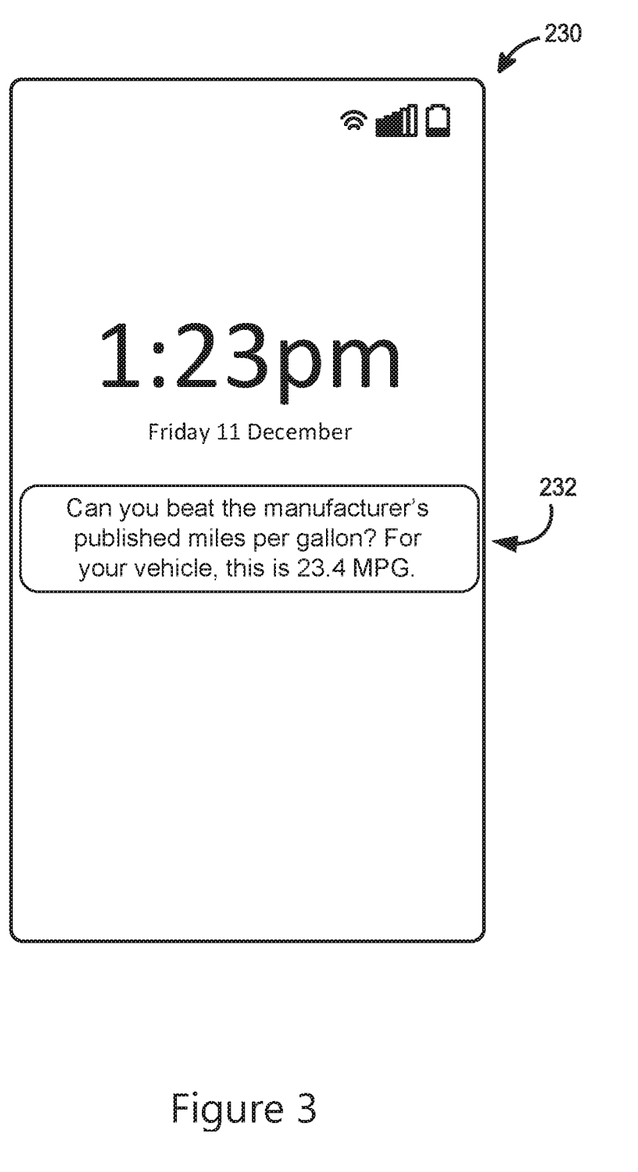
FIG. 3 depicts an example user interface on which user feedback regarding driving behavior is provided, according to one embodiment and scenario.

FIG. 3 depicts an example user interface on which user feedback regarding driving behavior is provided, according to one embodiment and scenario. A user interface 230 (e.g., presented on display 60) includes a push notification 232 with the message "Can you beat the manufacturer's published miles per gallon? For your vehicle, this is 23.4 MPG." In some embodiments, this notification may be sent to the user in response to the user's fuel efficiency being less than 23.4 MPG.

Figure 4:
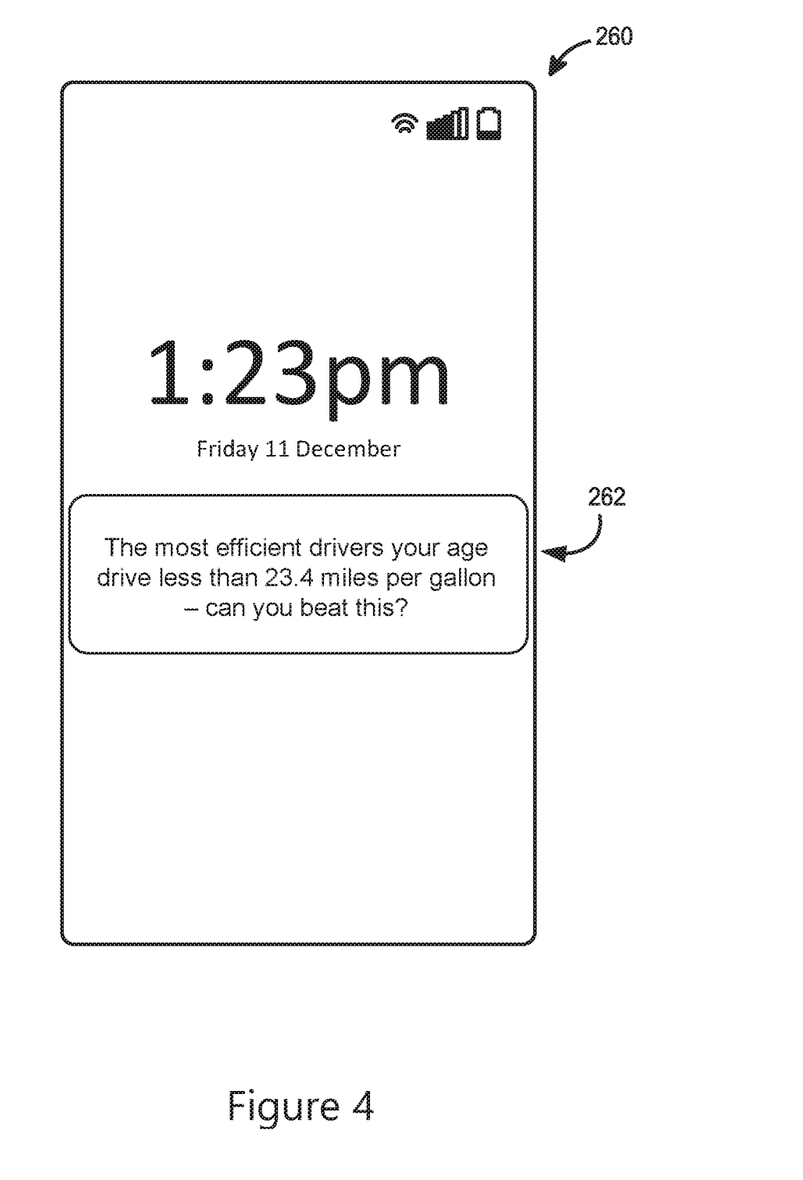
FIG. 4 depicts another example user interface on which user feedback regarding driving behavior is provided, according to another embodiment and scenario.

FIG. 4 depicts another example user interface on which user feedback regarding driving behavior is provided, according to another embodiment and scenario. A user interface 260 (e.g., presented on display 60) includes a push notification 262 with the message "The most efficient drivers your age drive less than 23.4 miles per gallon—can you beat this?" In some embodiments, this notification may be sent to the user in response to the user's fuel efficiency being less than 23.4 MPG.

Figure 5:
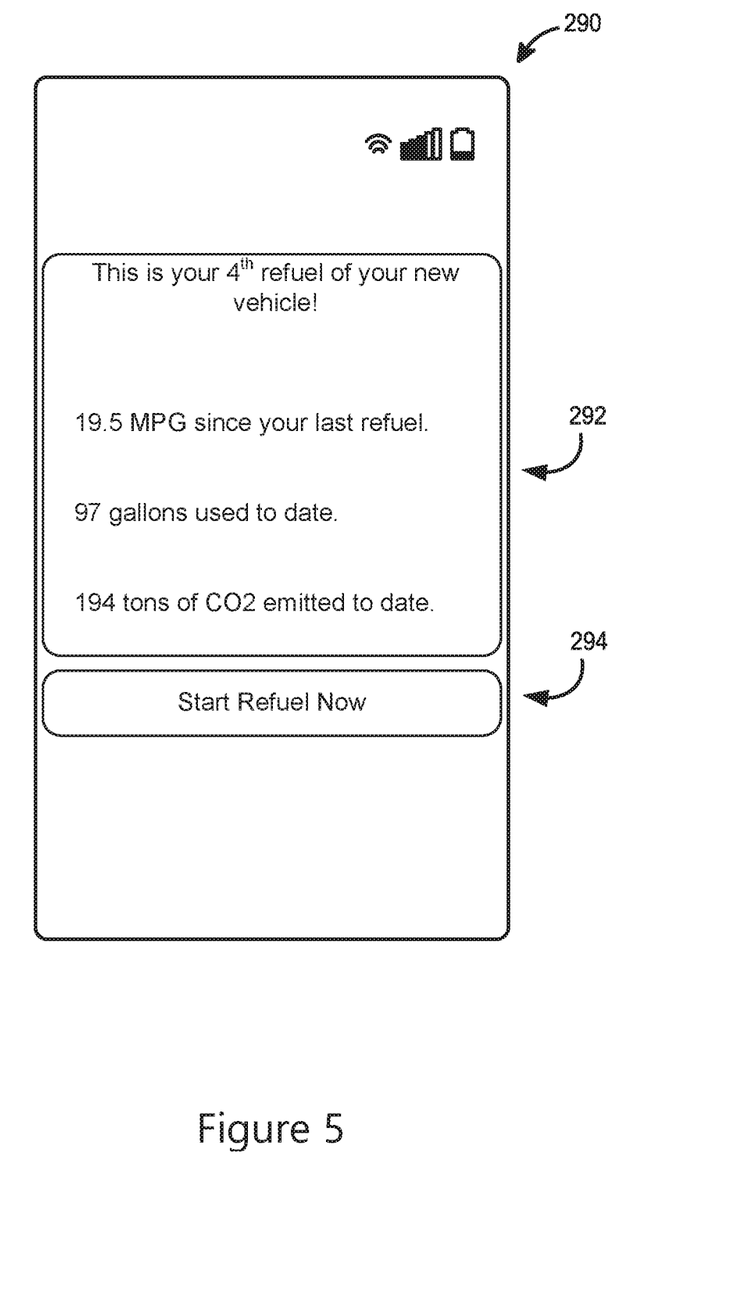
FIG. 5 depicts another example user interface on which user feedback regarding driving behavior is provided, according to another embodiment and scenario.

FIG. 5 depicts another example user interface on which user feedback regarding driving behavior is provided, according to another embodiment and scenario. A user interface 290 (e.g., presented on display 60) includes a push notification 292 with the message "This is your 4th refuel of your new vehicle! 19.5 MPG since your last refuel. 97 gallons used to date. 194 tons of CO2 emitted to date." In some embodiments, this message may be presented at the mobile device 12 in response to mobile device 12 being proximate to a gas station. Further, the user interface provides a user interaction tool 294 to begin a refuel. Beginning a refuel may include for example, taking a photograph of a gas receipt, taking photographs of the vehicle tires while fueling, and/or taking a photograph of an odometer before or after fueling.

Figure 6:
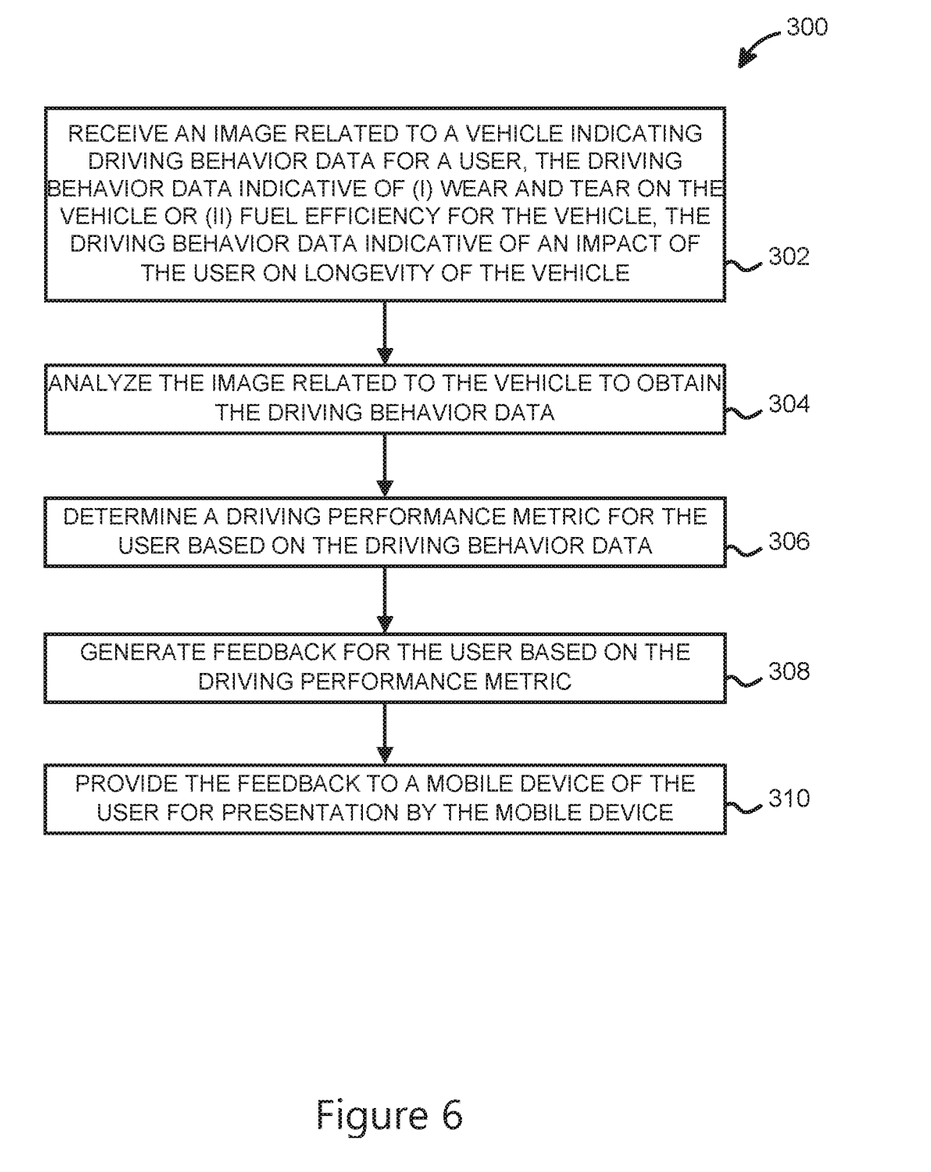
FIG. 6 is a flow diagram of an example method for generating and displaying user feedback regarding driving behavior, according to one embodiment, which may be implemented by a server or other computing system.

FIG. 6 is a flow diagram of an example method 300 for providing feedback to drivers of vehicles. The method 300 may be implemented by one or more processors of a computer system, such as processor 22 of server 14 in FIG. 1, for example.

In method 300, at block 302, an image corresponding to a vehicle indicating driving behavior data associated with a user, the driving behavior data indicative of (i) wear and tear on the vehicle or (ii) fuel efficiency for the vehicle, the driving behavior data indicative of an impact associated with the user on longevity of the vehicle is received the computing system (e.g., server 14).

The image corresponding to the vehicle is analyzed, at block 304, to obtaining the driving behavior data. Thereafter, at block 306, a driving performance metric associated with the user based at least in part upon the driving behavior data are determined. Next, at block 308, feedback associated with the user based at least in part upon the driving performance metric is generated. At block 310, the feedback is provided to a mobile device (e.g., mobile device 12) associated with the user for presentation by the mobile device.

Although specific embodiments of the present disclosure have been described, it will be understood by those of skill in the art that there are other embodiments that are equivalent to the described embodiments. Accordingly, it is to be understood that he present disclosure is not to be limited by the specific illustrated embodiments.

What is claimed is:

1. A computer-implemented method for providing feedback, the method comprising:
receiving, by one or more processors, one or more vehicle tire images for a vehicle;
analyzing, by the one or more processors, the one or more vehicle tire images to determine driving behavior data associated with a user, the driving behavior data indicative of an impact associated with the user on longevity of the vehicle;
determining, by the one or more processors, a driving performance metric associated with the user based at least in part upon the driving behavior data by at least:
applying, by the one or more processors, the driving behavior data associated with the user to a trained machine learning model for determining the driving performance metric,
wherein the trained machine learning model comprises a neural network and was trained:
to compare features identified in the one or more vehicle tire images with template features comprising tire dimensions, tire shapes, and tire thickness metrics at one or more tire positions,
using a plurality of sets of driving behavior data associated with a plurality of users with a plurality of vehicles each having known longevity, and
using a plurality of indications of respective known longevities of the plurality of vehicles associated with the plurality of users;
wherein the trained machine learning model creates numerical representations of the features identified in the one or more vehicle tire images to generate feature vectors that are compared to feature vectors of template objects using a vector distance metric to generate a tire wear score that is used to determine the driving performance metric associated with the user; and
wherein the features are extracted from the one or more vehicle tire images by (i) detecting stable regions within the one or more vehicle tire images using a scale-invariant feature transform, (ii) locating keypoints in the stable regions, and (iii) forming a bounding box around the keypoints representing the feature; and
generating, by the one or more processors, the feedback associated with the user based at least in part upon the driving performance metric and related to the impact on longevity of the vehicle; and
providing, by the one or more processors, the feedback to the user.

2. The method of claim 1, further comprising:
obtaining, by the one or more processors, a plurality of driving performance metrics associated with a plurality of other users,
wherein generating the feedback associated with the user includes:
comparing, by the one or more processors, the driving performance metric associated with the user to the plurality of driving performance metrics associated with the plurality of other users; and
wherein providing, by the one or more processors, the feedback to the user includes:
providing, by the one or more processors, an indication of the driving performance metric associated with the user relative to the plurality of driving performance metrics associated with the plurality of other users to the user.

3. The method of claim 2, wherein each other user of the plurality of other users is associated with a respective other vehicle that is at least one of a same make, a same model, or a same year as the vehicle associated with the user.

4. The method of claim 1, wherein the driving performance metric includes a wear and tear score associated with wear and tear on the vehicle.

5. The method of claim 1, wherein analyzing the one or more vehicle tire images comprises determining a thinning of tire material on a tire of the vehicle.

6. The method of claim 1, further comprising:
providing, by the one or more processors, an indication of a condition of the vehicle based at least in part upon the driving performance metric.

7. The method of claim 1, further comprising:
receiving additional driving behavior data from a mobile device of the user, sensors on the vehicle, or via user input on the mobile device,
wherein determining the driving performance metric is further based in part upon analyzing the additional driving behavior data.

8. The method of claim 1, wherein providing the feedback to the user includes:
providing, by the one or more processors, a prompt to the user to change one or more driving behaviors based at least in part upon the driving performance metric.

9. A computing system for providing feedback, the computing system comprising:
one or more processors; and
a program memory storing executable instructions that, when executed by the one or more processors, cause the computing system to:
receive one or more vehicle tire images for a vehicle;
analyze the one or more vehicle tire images to determine driving behavior data associated with a user, the driving behavior data indicative of an impact associated with the user on longevity of the vehicle;
determine a driving performance metric associated with the user based at least in part upon the driving behavior data by at least:
applying the driving behavior data associated with the user to a trained machine learning model for determining the driving performance metric,
wherein the trained machine learning model comprises a neural network and was trained:
to compare features identified in the one or more vehicle tire images with template features comprising tire dimensions, tire shapes, and tire thickness metrics at one or more tire positions, using a plurality of sets of driving behavior data associated with a plurality of users with a plurality of vehicles each having known longevity, and using a plurality of indications of respective known longevities of the plurality of vehicles associated with the plurality of users; and wherein the trained machine learning model creates numerical representations of the features identified in the one or more vehicle tire images to generate feature vectors that are compared to feature vectors of template objects using a vector distance metric to generate a tire wear score that is used to determine the driving performance metric associated with the user; and wherein the features are extracted from the one or more vehicle tire images by (i) detecting stable regions within the one or more vehicle tire images using a scale-invariant feature transform, (ii) locating keypoints in the stable regions, and (iii) forming a bounding box around the keypoints representing the feature; and generate the feedback associated with the user based at least in part upon the driving performance metric and related to the impact on longevity of the vehicle; and provide the feedback to the user.

10. The computing system of claim 9, wherein the program memory further stores executable instructions that cause the computing system to:

obtain a plurality of driving performance metrics associated with a plurality of other users, wherein to generate the feedback associated with the user includes:

comparing the driving performance metric associated with the user to the plurality of driving performance metrics associated with the plurality of other users; and wherein to provide the feedback to the user includes:

providing an indication of the driving performance metric associated with the user relative to the plurality of driving performance metrics associated with the plurality of other users to the user.

11. The computing system of claim 10, wherein each other user of the plurality of other users is associated with a respective other vehicle that is at least one of a same make, a same model, or a same year as the vehicle associated with the user.

12. The computing system of claim 9, wherein the driving performance metric includes:

a wear and tear score associated with wear and tear on the vehicle.

13. The computing system of claim 9, wherein to analyze the one or more vehicle tire images comprises to determine a thinning of tire material on a tire of the vehicle.

14. The computing system of claim 9, wherein the program memory further stores executable instructions that cause the computing system to:

provide an indication of a condition of the vehicle based at least in part upon the driving performance metric.

15. The computing system of claim 9, wherein the program memory further stores executable instructions that cause the computing system to:

receive additional driving behavior data from a mobile device of the user, sensors on the vehicle, or via user input on the mobile device, wherein to determine the driving performance metric is further based at least in part upon analyzing the additional driving behavior data.

16. The computing system of claim 9, wherein to provide the feedback to the user includes to provide a prompt to the user to change one or more driving behaviors based at least in part upon the driving performance metric.

17. One or more non-transitory computer-readable media storing instructions for providing feedback, that when executed by one or more processors of a computing device, cause the computing device to:

receive one or more vehicle tire images for a vehicle;

analyze the one or more vehicle tire images to determine driving behavior data associated with a user, the driving behavior data indicative of an impact associated with the user on longevity of the vehicle;

determine a driving performance metric associated with the user based at least in part upon the driving behavior data by at least:

applying the driving behavior data associated with the user to a trained machine learning model for determining driving performance metrics, wherein the trained machine learning model comprises a neural network and was trained:

to compare features identified in the one or more vehicle tire images with template features comprising tire dimensions, tire shapes, and tire thickness metrics at one or more tire positions, using a plurality of sets of driving behavior data associated with a plurality of users with a plurality of vehicles each having known longevity, and using a plurality of indications of respective known longevities of the plurality of vehicles associated with the plurality of users; and wherein the trained machine learning model creates numerical representations of the features identified in the one or more vehicle tire images to generate feature vectors that are compared to feature vectors of template objects using a vector distance metric to generate a tire wear score that is used to determine the driving performance metric associated with the user; and wherein the features are extracted from the one or more vehicle tire images by (i) detecting stable regions within the one or more vehicle tire images using a scale-invariant feature transform, (ii) locating keypoints in the stable regions, and (iii) forming a bounding box around the keypoints representing the feature; and generate the feedback associated with the user based at least in part upon the driving performance metric and related to the impact on longevity of the vehicle; and provide the feedback to the user.

18. The one or more non-transitory computer-readable media of claim 17, storing additional instructions, that when executed by the one or more processors of the computing device, further cause the computing device to:

obtain a plurality of driving performance metrics associated with a plurality of other users, wherein to generate the feedback associated with the user includes:

comparing the driving performance metric associated with the user to the plurality of driving performance metrics associated with the plurality of other users; and wherein to provide the feedback to the user includes:
provide an indication of the driving performance metric associated with the user relative to the plurality of driving performance metrics associated with the plurality of other users to the user.

19. The one or more non-transitory computer-readable media of claim 18, wherein each other user of the plurality of other users is associated with a respective other vehicle that is at least one of a same make, a same model, or a same year as the vehicle associated with the user.

20. The one or more non-transitory computer-readable media of claim 17, wherein the driving performance metric includes:
a wear and tear score associated with wear and tear on the vehicle.

* * * * *